United States Patent
Deych et al.

(10) Patent No.: US 10,090,072 B2
(45) Date of Patent: Oct. 2, 2018

(54) THREE-DIMENSIONAL METAL PRINTING

(71) Applicant: Analogic Corporation, Peabody, MA (US)

(72) Inventors: Ruvin Deych, Gloucester, MA (US); Daniel Abenaim, Lynnfield, MA (US)

(73) Assignee: ANALOGIC CORPORATION, Peabody, MA (US)

( * ) Notice: Subject to any disclaimer, the term of this patent is extended or adjusted under 35 U.S.C. 154(b) by 855 days.

(21) Appl. No.: 14/588,641

(22) Filed: Jan. 2, 2015

(65) Prior Publication Data

US 2015/0115494 A1    Apr. 30, 2015

Related U.S. Application Data (62) Division of application No. 12/978,682, filed on Dec. 27, 2010.

(51) Int. Cl.
| | | |
|---|---|---|
| *B22F 3/11* | (2006.01) | |
| *G21K 1/00* | (2006.01) | |
| *G21K 1/02* | (2006.01) | |
| *B22F 3/00* | (2006.01) | |
| *B29C 70/58* | (2006.01) | |
| *B29C 64/141* | (2017.01) | |
| *B41M 3/00* | (2006.01) | |
| *B33Y 10/00* | (2015.01) | |
| *B29K 103/06* | (2006.01) | |
| *B29K 505/08* | (2006.01) | |
| *B29L 11/00* | (2006.01) | |
| *B29L 31/34* | (2006.01) | |
| *B29L 31/00* | (2006.01) | |

(52) U.S. Cl.
CPC ............... *G21K 1/00* (2013.01); *B22F 3/008* (2013.01); *B29C 64/141* (2017.08); *B29C 70/58* (2013.01); *G21K 1/025* (2013.01); *B29K 2103/06* (2013.01); *B29K 2505/08* (2013.01); *B29L 2011/00* (2013.01); *B29L 2031/34* (2013.01); *B29L 2031/737* (2013.01); *B33Y 10/00* (2014.12); *B41M 3/00* (2013.01)

(58) Field of Classification Search
CPC .................................................. B29C 67/0074
See application file for complete search history.

(56) References Cited

U.S. PATENT DOCUMENTS

| 5,204,055 A | * | 4/1993 | Sachs | ...................... B05C 19/04 264/113 |
|---|---|---|---|---|
| 2001/0036516 A1 | * | 11/2001 | Schmidt | ............... C04B 41/009 427/559 |
| 2003/0072415 A1 | * | 4/2003 | Eidam | .................... G21K 1/025 378/154 |
| 2005/0281701 A1 | * | 12/2005 | Lynch | ...................... B22F 3/22 419/10 |
| 2006/0055087 A1 | * | 3/2006 | Freund | ................... G21K 1/025 264/401 |
| 2010/0061520 A1 | * | 3/2010 | Dorscheid | ............. B22F 3/1055 378/154 |

* cited by examiner

*Primary Examiner* — Christopher Kessler
(74) *Attorney, Agent, or Firm* — Cooper Legal Group, LLC (57) ABSTRACT

One or more metal printing techniques are described for generating a three-dimensional metal structure, such as a one-dimensional or two-dimensional anti-scatter grid. The techniques comprise applying a thin layer of powdered metal onto a printing area and using a binder (which is printed onto the printing area according to a specified pattern) to bind the powdered metal particles together. The acts of applying powdered metal and a binder may be repeated a plurality of times until a three-dimensional metal structure having a specified height is created. Moreover, in one embodiment, once the layering is complete, another binder is applied to the one or more layers to provide strength and/or support. While heat may be used in some embodiments to activate one or more of the applied binders the three-dimensional metal structure is generally not heated to a melting point of the powdered metal.

20 Claims, 5 Drawing Sheets

THREE-DIMENSIONAL METAL PRINTING

RELATED APPLICATIONS

This application is a divisional of and claims priority to U.S. patent application Ser. No. 12/978,682, titled "THREE-DIMENSIONAL METAL PRINTING" and filed on Dec. 27, 2010, which is incorporated herein by reference.

BACKGROUND

The present application relates to three-dimensional metal printing. It finds particular application with radiation imaging systems that comprise anti-scatter devices, including one-dimensional and/or two-dimensional anti-scatter grids, for example.

Radiographic imaging systems, such as computed tomography (CT) devices, for example, provide information, or images, of an object under examination or rather interior aspects of the object. For example, in radiographic imaging systems, the object is exposed to radiation, and one or more images are formed based upon the radiation absorbed by the object, or rather an amount of radiation that is able to pass through the object. Typically, highly dense objects absorb (e.g., attenuate) more radiation than less dense objects, and thus an object having a higher density, such as a bone or gun, for example, will appear differently than less dense objects, such as fatty tissue or clothing, for example.

A radiographic imaging system typically comprises a detector array and a radiation source respectively mounted on diametrically opposing sides of an examination region within which the object under examination resides. Radiation that traverses the object under examination is detected by one or more channels (also commonly referred to as pixels) of the detector array and respective signals are generated in response thereto. The signals are indicative of characteristics of the radiation that is detected by the respective channels and, thus, are indicative of the attenuation of the object from a particular view, or projection.

In an ideal environment, the radiation that is detected by a channel of the detector array corresponds to attenuated radiation that strikes the channel on a straight axis from a focal spot of the radiation source. This type of radiation is commonly referred to as primary radiation. However, due to inevitable interactions with the object and/or the imaging system, typically some of the radiation that is detected has deviated from the straight axis. Radiation that has deviated from the straight axis is commonly referred to as scattered radiation or secondary radiation. It will be appreciated that the detection of secondary radiation is undesirable because it can increase noise in a signal generated from the channel detecting the secondary radiation and/or it can reduce the quality of an image yielded from the signal.

In order to reduce the amount of secondary radiation that is detected by channels of the detector array, anti-scatter grids are commonly inserted between the examination region and the detector array. The anti-scatter grids are comprised of a plurality of anti-scatter plates or septa configured to absorb secondary radiation and a plurality of transmission channels configured to allow primary radiation to pass through the grid and be detected by a channel of the detector array. It will be appreciated that besides the aforementioned anti-scatter grid, other anti-scatter devices may be situated within the imaging system to absorb and/or attenuate radiation. For example, anti-scatter devices may be configured to mitigate the amount of radiation that escapes the examination region.

To absorb radiation, anti-scatter devices are generally comprised of high density metals, such as tungsten and/or molybdenum. Traditionally, 2D anti-scatter devices have been manufactured using casting techniques, which generally involve pouring a compound comprising liquid resin and metal particles into a mold (e.g., comprising a hollow cavity in the shape of the anti-scatter device being created). Once the resin has hardened, the anti-scatter device is removed from the mold. It will be appreciated that in some applications, an anti-scatter device is formed from multiple molds that produce layers of the anti-scatter device, where the layers are stacked on top of one another to form the anti-scatter device, once removed from the molds. For example, an anti-scatter grid may be tapered so as to define a channel having open ends that have different dimensions and/or that have dimensions that vary along the length of the channel. Accordingly, such an anti-scatter device may be made using a plurality of molds because the varying dimensions of the device may make it difficult to remove the device, as a single layer or element, from the mold and/or it may be difficult to flow the liquid resin into all of the different crevices of the mold, for example. In this situation, once the castings have hardened and been removed from the respective mold elements, the castings are precisely aligned and adhered together (e.g., using another liquid resin) to form the completed anti-scatter device (e.g., comprised of several layers of castings).

While current manufacturing techniques have proven useful in manufacturing 2D anti-scatter devices, the techniques are resource and time intensive. For example, precision alignment of the castings generally requires expensive machines and is time consuming. Moreover, the castings have to be polished to remove excess resin, particularly from the crevices between the layers). Thus, it would be beneficial to manufacture three-dimensional metal structures, and in particular three-dimensional anti-scatter devices, using non-casting techniques.

SUMMARY

Aspects of the present application address the above matters, and others. According to one aspect, a method for three-dimensional metal printing is provided. The method comprises printing a first pattern onto a printing area by applying a first binder to the printing area and applying a first layer of powdered metal onto the printing area before or during or after the first binder is applied, the first binder configured to bind particles of the first layer of powdered metal. The method also comprises printing a second pattern on the printing area by applying a second binder to the printing area and applying a second layer of powdered metal onto the printing area before or during or after the second binder is applied, the second layer imposed adjacent the first layer of powdered metal, the second binder configured to bind particles of the second layer of powdered metal. The method further comprises infiltrating the first and second layers of powdered metal using a third binder to yield a three-dimensional metal structure.

According to another aspect, an anti-scatter apparatus manufactured from a metal printing process is provided. The anti-scatter apparatus comprises a radiation attenuating metal and a binding agent configured to bind a first portion of the metal to a second portion of the metal.

According to yet another aspect, a method for generating a three-dimensional anti-scatter apparatus of a radiographic examination apparatus is provided. The method comprises creating a first layer of the three-dimensional anti-scatter apparatus using a radiation attenuating, powdered metal. The method also comprises creating a second layer of the three-dimensional anti-scatter apparatus using the radiation attenuating, powdered metal. The method further comprises applying a first binder configured to bind the first layer of the three-dimensional anti-scatter apparatus to the second layer of the three-dimensional anti-scatter apparatus to generate the three-dimensional anti-scatter apparatus.

Those of ordinary skill in the art will appreciate still other aspects of the present application upon reading and understanding the appended description.

FIGURES

The application is illustrated by way of example and not limitation in the figures of the accompanying drawings, in which like references indicate similar elements and in which.

DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more techniques for manufacturing a three-dimensional metal structure using powdered metal and a binder are provided. Specifically, the binder is printed onto a printing area in a pattern and a powdered metal is applied to the printing area (e.g., before, during, and/or after the printing of the binder). The binder adheres to the powered metal, causing the metal to take of the shape of the pattern of the binder. This process of printing and applying powdered metal is repeated n number of times, where n is a positive integer, until the desired three-dimensional structure is created. In this way, a three-dimensional metal structure is created using powdered metal. Moreover, in one embodiment, using the techniques described herein, an anti-scatter apparatus that comprises a radiation attenuating metal and a binding agent is created.

Figure 1:
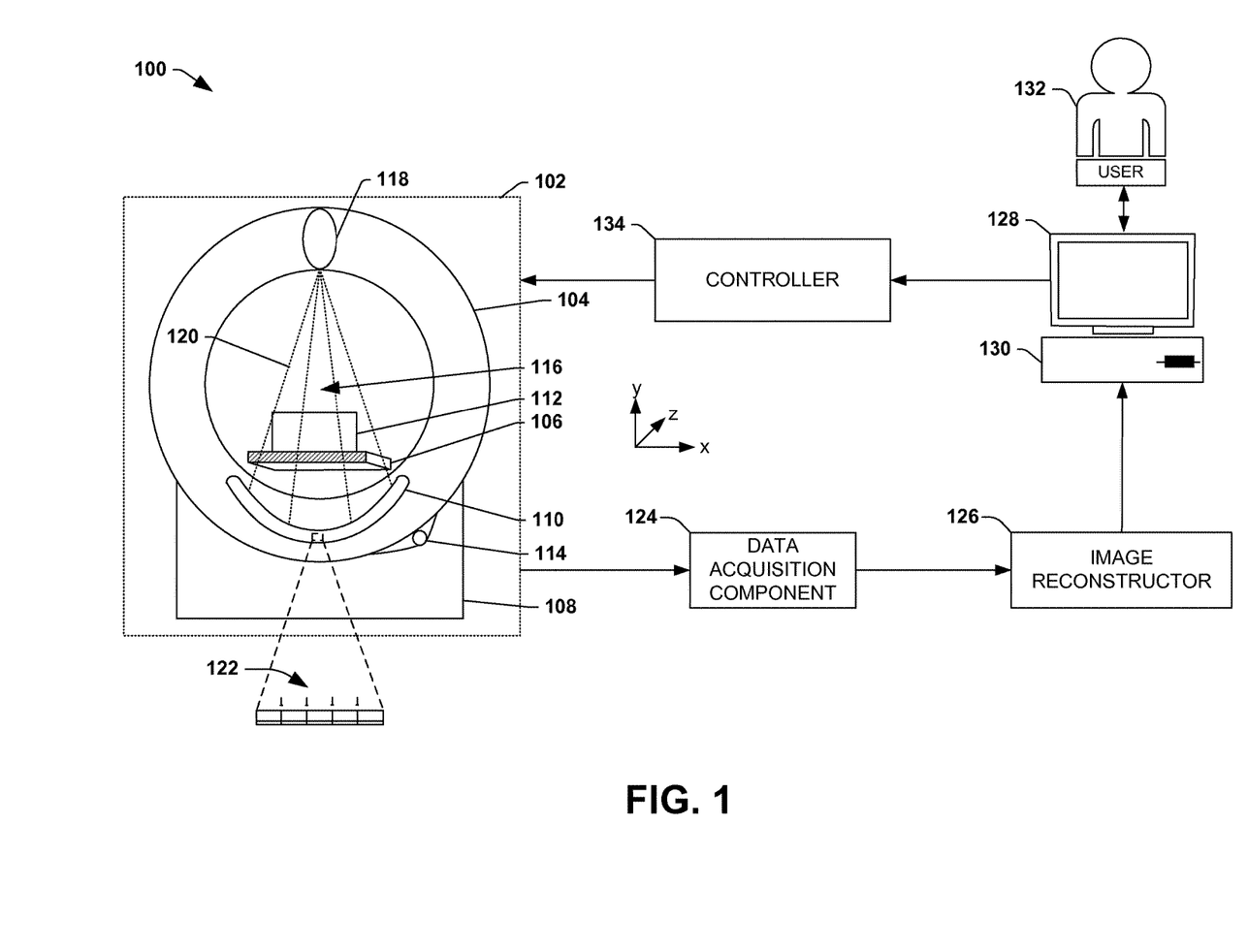
FIG. 1 depicts a schematic block diagram of an example radiographic examination apparatus.

FIG. 1 is an illustration of an example environment 100 in which data that is generated from components comprised within a rotating gantry 104 of a radiography examination apparatus (e.g., a CT scanner) may be acquired so that one or more images of an object 112 under examination may be produced and displayed on a monitor 128, for example, for viewing by a human user 132. Such an examination apparatus may be used to identify a tumor in a human patient at a medical center or in an animal at a veterinary clinic, and/or to identify objects of interest (e.g., potential threat objects, banned objects, etc.) associated with (e.g., comprising, comprised within, etc.) the object 112 (e.g., luggage) under examination at a security checkpoint, for example. In another embodiment, no image is generated, but density and/or atomic characteristics of the object 112 can be identified and compared with a list of densities and/or atomic characteristics associated with predetermined items (e.g., banned items) to determine if the object 112 potentially comprises one or more of the predetermined items. It will be appreciated that while a CT examination apparatus is described herein, the instant application is not intended to be so limited. That is, to the extent possible, the instant application, including the scope of the claimed subject matter, is intended to be applicable to other systems as well. For example, the claimed subject matter is intended to be applicable to other radiographic systems, such as mammography systems, line scanners, and/or other systems comprising one or more metal components that may be manufactured using three-dimensional printing techniques as described herein. It will also be appreciated that the example environment 100 merely illustrates an example schematic and is not intended to be interpreted in a limiting manner, such as necessarily specifying the orientation of the components described herein. For example, a data acquisition component 124 as illustrated in FIG. 1 may be part of a rotating gantry 104 portion of the examination apparatus, or more particularly may be part of a detector array 110, for example.

In the example environment 100, the examination apparatus comprises an object examination apparatus 102 configured to examine one or more objects 112 (e.g., a series of suitcases at an airport, a human patient, etc.). The object examination apparatus 102 can comprise a rotating gantry 104 and a stationary portion 108. During an examination of the object(s) 112, the object(s) 112 can be placed on a support article 106, such as a bed or conveyor belt, that is selectively positioned in an examination region 116 (e.g., a hollow bore in the rotating gantry portion 104), and the rotating gantry 104 can be rotated about the object(s) 112 by a rotator 114 (e.g., a motor, drive shaft, chain, etc.).

The rotating gantry 104 may surround a portion of the examination region 116 and comprises one or more radiation sources 118 (e.g., an ionizing x-ray source) and a detector array 110, which may also be referred to herein as merely a detector, that is mounted on a substantially diametrically opposite side of the rotating gantry 104 relative to the radiation source(s) 118.

During an examination of the object(s) 104, the radiation source(s) 118 emits fan, cone, wedge, and/or other shaped radiation 120 configurations into the examination region 116 of the object examination apparatus 102. It will be appreciated to those skilled in the art that such radiation may be emitted substantially continuously and/or may be emitted intermittently (e.g., a short pulse of radiation is emitted followed by a resting period during which the source is not activated).

As the emitted radiation 120 traverses the object(s) 112, the radiation 120 may be attenuated differently by different aspects of the object(s) 112. Because different aspects attenuate different percentages of the radiation 120, an image(s) may be generated based upon the attenuation, or rather the variations in the number of radiation photons that are detected by the detector array 110. For example, more dense aspects of the object(s) 112, such as a bone or metal plate, may attenuate more of the radiation 120 (e.g., causing fewer photons to strike the detector array 110) than less dense aspects, such as skin or clothing.

It will be appreciated that numerous compositions for the detector array 110 are known to those skilled in the art and may be used in the example environment 100. For example, the detector array 110 may comprise a direct conversion detector material, such as a crystalline material (e.g., cadmium zinc telluride, cadmium telluride, etc.) and/or an amorphous photoelectric material. Alternatively, the detector array 110 may be a solid state detector comprised of scintillating crystals and a two-dimensional array of photodetectors configured to receive light generated by the scintillator in response to radiation 120 emitted from the radiation source 118, for example. Stated differently, the detector array 110 may be a direct conversion or indirect conversion detector array, for example.

Generally, the detector array 110 is comprised of a plurality of (interchangeable) detector modules that are positioned to form an arcuate structure. Respective detector modules comprise a plurality of channels (also referred to as pixels) that are respectively configured to detect radiation that impinges the detector array 110 in close spatial proximity to the location of the channel on the detector array 110. It will be appreciated that while reference is made to an arcuate detector array comprised of a plurality of detector modules, other configurations are also contemplated. For example, in another embodiment, the detector array 110 can be comprised of a single, rectangular detector module (e.g., flat panel detector) that substantially spans the length of the detector array 110 and comprises a plurality of channels.

The channels are configured to detect radiation 120 and generate signals, or pulses (hereinafter generally collectively referred to as signals), in response thereto that are indicative of the detected radiation. To reduce the amount of secondary radiation that is detected by the respective channels (and to reduce noise in signals generated by the channels), an anti-scatter grid 122 (also referred to as an anti-scatter collimator) is situated in the example object examination apparatus 102 between the examination region 116 and the detector array 110. The anti-scatter grid 122 is configured to absorb, or otherwise alter secondary radiation, so that it is not detected by channels of the detector array 110, while allowing primary radiation to pass through. In the example environment 100, a portion of the anti-scatter grid 122 is enlarged for illustration purposes.

As will be discussed in more detail with regards to FIG. 3, the anti-scatter grid 122 is generally comprised of one or more anti-scatter modules (not shown), and the anti-scatter grid 122 can be assembled by joining adjacent anti-scatter modules together, for example. It will be appreciated that the number of modules may depend on the application and/or on assembly preferences (e.g., whether it is more economical to make a single, larger module, or many smaller modules), for example. In one embodiment, the number of anti-scatter modules is a function of the number of detector modules that comprise the detector array 110. In this way, respective anti-scatter modules may be attached to a detector module prior to assembly of the detector array 110, for example.

Signals that are produced by channels of the detector array 110 can be transmitted from the detector array 110 to a data acquisition component 124 configured to compile signals that were transmitted within a predetermined time interval, or measurement interval, using techniques known to those skilled in the art (e.g., binning, integration, etc.). It will be appreciated that such a measurement interval may be referred to as a "view" and generally reflects signals generated from radiation 120 that was emitted while the radiation source 118 was at a particular angular range relative to the object 112. Based upon the compiled signals, the data acquisition component 124 can generate projection data indicative of the compiled signals, for example.

The example environment 100 further comprises an image reconstructor 126 configured to receive the projection data that is output by the data acquisition component 124. The image reconstructor 126 is configured to generate image data from the projection data using a suitable analytical, iterative, and/or other reconstruction technique (e.g., back-projection reconstruction, tomosynthesis reconstruction, etc.). In this way, the data is converted from projection space to image space, a domain that may be more understandable by a user 132 viewing the image(s), for example.

The example environment 100 also includes a terminal 130, or workstation (e.g., a computer), configured to receive the image(s), which can be displayed on the monitor 128 to the user 132 (e.g., security personnel, medical personnel, etc.). In this way, a user 132 can inspect the image(s) to identify areas of interest within the object(s) 112. The terminal 130 can also be configured to receive user input which can direct operations of the object examination apparatus 102 (e.g., a speed to rotate, a speed of a conveyor belt, etc.).

In the example environment 100, a controller 134 is operably coupled to the terminal 130. In one example, the controller 134 is configured to receive user input from the terminal 130 and generate instructions for the object examination apparatus 102 indicative of operations to be performed. For example, the user 132 may want to reexamine the object(s) 112, and the controller 134 may issue a command instructing the support article 106 to reverse direction (e.g., bringing the object(s) 112 back into an examination region 116 of the object examination apparatus 102).

Figure 2:
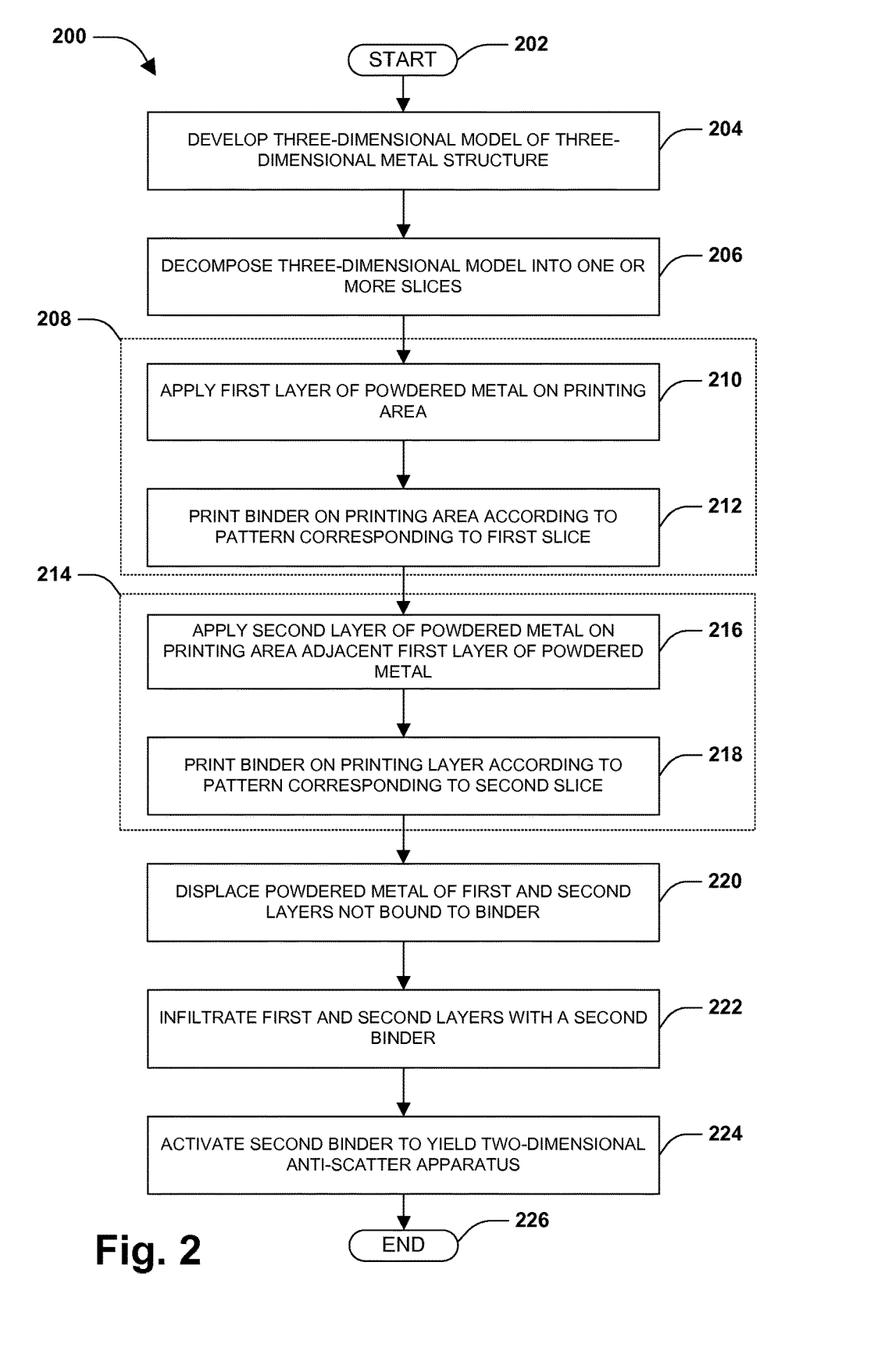
FIG. 2 illustrates an example method for three-dimensional metal printing.

FIG. 2 illustrates an example method 200 for three-dimensional metal printing, such as may be used to construct a three-dimensional anti-scatter device, such as a one or two-dimensional anti-scatter grid (e.g., 122 in FIG. 1), for example. The example method 200 begins at 202 and a three-dimensional model of the three-dimensional metal structure, is developed at 204. Generally, this model is developed using a computer modeling program that is configured to generate models based upon specified criteria (e.g., dimensions). However, it will be appreciated that the subject matter of the instant application, including the claimed subject matter, is not intended to be limited as such. For example, in another embodiment, a three-dimensional model is developed by a skilled artisan using clay and/or another pliable material.

The example method 200 also comprises decomposing the three-dimensional model into one or more slices at 206. Generally, the number of slices are a function of the capabilities of the printer and/or the height dimension of the three-dimension structure that is being constructed. For example, an inkjet printer may be configured to develop a layer having a thickness in the range of about 20 microns to about 100 microns. Thus, the total thickness of the metal structure (e.g., as represented by the three-dimensional model) would be divided by a number somewhere between 20 microns and 100 microns to yield the total number of slices. The model (e.g., which may be a scaled representation of the three-dimensional metal structure) may then be decomposed into the specified number of slices accordingly.

For example, in the case of a one-dimensional and/or two-dimensional anti-scatter grid, the height, or thickness, of the metal structure is generally in the range of about 10 millimeters to about 35 millimeters. Thus, a model representing the anti-scatter grid would be decomposed into about 100 to about 350 slices (e.g., assuming each layer is 100 microns thick).

It will be appreciated that respective slices represent a printing pattern. Stated differently, by decomposing the three-dimensional model into slices, printing patterns are generated, where respective patterns correspond to a slice of the model. For example, a first slice represents a first printing pattern, a second slice represents a second printing pattern, etc. It will be appreciated that respective printing patterns may be different (e.g., no two may be alike) and/or some or all of the printing patterns may be the same. The printing patterns are based upon the structure of the three-dimensional metal apparatus represented within their respective slice. Thus, two adjoining slices may correspond to a same printing pattern (e.g., the first and second printing patterns may be the same), where there are no changes in the structure of the three-dimensional metal apparatus between, or within, the two adjoining slices, for example.

Once the printing pattern(s) have been generated, the printing may begin. In the example method 200, the printing begins by creating a first layer of the three-dimensional metal structure using powdered metal at 208. As illustrated, the creation of the first layer comprises applying a first layer of powdered metal onto a printing area 210. Generally, the powdered metal is dispersed on the printing area such that a thin layer (e.g., about 20 to about 100 microns thick) of powdered metal coats substantially all of the printing area 208. Stated differently, the powdered metal is generally not applied in any sort of pattern, but rather is layered on (e.g., in excess).

The type and/or particle size of the metal powder may depend upon specified characteristics of the metal structure that is being constructed. For example, where the three-dimensional metal structure is an anti-scatter device, the powdered metal may be comprised of a metal configured to attenuate radiation, or more specifically, attenuate x-rays, such as tungsten, molybdenum, lead, and/or other high density metal, for example. In such an application, a preferred particle size of the powdered metal might be in the range of about 5 microns to about 25 microns in diameter, for example.

The creation of the first layer at 208 also comprises printing a binder on the printing area according to a pattern corresponding to a first slice at 212. Stated differently, based upon the pattern of the first slice that was generated by decomposing the three-dimensional model at 206, a binder is printed onto the printing area, or more particularly, in the example method, onto the first layer of powdered metal. The binder, which, in one example, may merely be used temporarily until a permanent binder can be applied to the entire structure is generally configured to cause the metal powder particles to adhere to one another and may be comprised of one or more epoxies and/or other materials having characteristics that are known to those skilled in the art for binding powders. In this way, metal particles that are in close spatial proximity to where the binder is applied are glued, or otherwise adhered/bonded, together while metal particles in areas of the printing area where the binder is not applied are left loose (e.g., and can be brushed off the printing area).

The process of applying a layer of powdered metal and printing a binder may be repeated n number of times, where n is a positive integer corresponding to the number of slices (e.g., and therefore print patterns) generated from the decomposition of the three-dimensional model at 206. In this way, the three-dimensional structure is constructed, or built-up, from a plurality of layers of powdered metal that are stacked on top of or below one another.

For example, in the example method 200, a second layer of the three-dimensional structure is created using powdered metal at 214. The creation of the second layer comprises applying a second layer of powdered metal on the printing area adjacent the first layer of powdered metal at 216. Like the first layer, the second layer of powdered metal is generally applied generously without regard to following a pattern. That is, in one example, a thin layer of powdered metal (e.g., about 20 microns to about 100 microns thick) may be applied to substantially all of the printing area.

It will be appreciated that the characteristics, or type, of powdered metal that is applied may be a function of the intended application for the three-dimensional metal structure, and the second layer of powdered metal may be different than the first layer of powdered metal applied at 210. For example, if an anti-scatter device is being manufactured, the first layer may be comprised of powdered tungsten metal and the second layer may be comprised of powdered molybdenum metal (e.g., two different metals configured to attenuate radiation). In another example, the first and second layers may both be comprised of powdered tungsten metal or powdered molybdenum metal or both powdered tungsten metal and powdered molybdenum metal. Thus, the composition of respective layers of powdered metal may vary such that respective layers are comprised of different powdered metals and/or one or more layers may be comprised of the same powdered metal(s).

The creation of the second layer also comprises printing a binder on the printing area according to a pattern corresponding to a second slice at 218. Stated differently, based upon a pattern corresponding to a second slice of the decomposed three-dimensional model, a binder is printed on the printing material, or on the second layer of the powdered metal. It will be appreciated that the binder, which, in one embodiment, may merely be used temporarily until the entire three-dimensional structure is constructed, may have a same or similar chemical composition as the binder printed on the first layer or it may have a substantially different chemical composition. That is, for example, the same epoxy may be printed on the first and second layers of powdered metal or a different epoxy may be printed on the second layer than on the first layer. Thus, the terms "first" and "second" binder may be used to mean different binders or the same binder.

Like the binder printed on the first layer, the binder printed on the second layer is configured to cause powdered metal proximate the printed binder to adhere together, causing a solid structure to be built out of the powdered metal particles in the second layer. Particles of powdered metal that are not proximate a printed binder are not adhered together, and thus may be brushed away, for example.

It will be appreciated that, in one embodiment, between the creation of respective layers, the printing area, or a building platform on which the printing area is located, may be adjusted (e.g., lowered or raised) to accommodate the printing of an additional layer (e.g., on top of or below the previously created layer). In another embodiment, the printer (e.g., a powdered metal dispersing component configured to apply the powdered metal and/or a head of the printer that prints the binder) is configured to raise and/or lower to accommodate the creation of an additional layer of the three-dimensional metal structure. Moreover, it will be appreciated that between the creation of layers, a drying time may be applied that allows the printed binder (e.g., the epoxy) to dry before the next layer is created. Thus, between the creation of the first layer at 208 and the second layer at 214, there may be a temporal break to allow the binder that was printed on the first layer at 212 to dry (e.g., to some degree).

In the example method, once the printing of the layers is complete, excess powdered metal (e.g., powdered metal of the first and second layers that is not bound to the binder) is displaced at 220. For example, in one embodiment, high pressured air is applied to the printing area, causing powdered metal (e.g., from one or more layers) that is not glued, or bound, by a binder to be displaced from the printing area. In yet another embodiment the printing area is merely brushed or suctioned, causing loose particles (e.g., particles not adhered to a binder) to be displaced. In another example, the three-dimensional printing area is submersed in fluid and particles that are not adhered to a binder merely wash away. Thus, it will be appreciated that a number of ways are contemplated for dispersing excess powdered metal that is not intended to be part of the completed three-dimensional metal structure.

It will be appreciated that while reference is made to displacing residual powdered metal from two or more layers at once after the printing process is complete (e.g., after the first and second layers are created at 208 and 214), in another embodiment, residual powdered metal is displaced from respective layers individually. That is, for example, the displacement of powdered metal of the first layer that is not bound to a binder may occur after the creation of the first layer at 208 and before the creation of the second layer at 214. Thus, excess powdered metal that is not bound by the binder is dispersed before a next layer is created. It will be appreciated that such a technique may be useful for reducing the likelihood that powdered metal from one layer is accidently bound by a binder that is being applied to a different layer, for example. Similarly, residual powdered metal may be displaced from any number of layers and/or at any intervals, where the number of layers and/or intervals may vary as well.

While at this point in the example method 200 all layers have been created and excess metal particles have been removed, the layers may not be completely bound to one another. That is, a first layer may be able to be separated from the second layer. Thus, at 222 in the example method 200 the first and second layers are infiltrated with another binder (e.g., which may have the same or a different chemical composition than the binders printed on the printing area at 212 and 218) that causes the layers to be bound to one another (e.g., the first layer is bound to the second layer). For example, in one embodiment, the printing area (e.g., including the completed layers) is temporarily submerged in a binder (e.g., an epoxy). It will be appreciated that this infiltration may provide support and strength to the three-dimensional metal structure, for example. Moreover, the infiltrating binder may displace some or all of the binders applied at 212 and/or 218, for example, that established the patterns in/formed out of the powdered metals.

In the example method 200, the binder that infiltrated the layers at 222 is activated at 224 to yield the three-dimensional composite or monolithic metal structure. It will be appreciated that the technique(s) for activating the binder may depend upon properties of the binder that is used. For example, in one embodiment, the binder is activated by heating it to a temperature that causes the epoxy to enter its liquid phase. Generally, this temperature is below the melting point of the metals comprised in one or more layers, and thus the powdered metal itself does not melt. In another embodiment, the binder is activated using ultraviolet light. Thus, no heat is applied to the three-dimensional metal structure, but rather the binder is activated based upon light energy, for example. Thus, there are numerous ways for activating a binder known to those skilled in the art that may be applied to the techniques described herein. Additionally, one or more additional layers may subsequently be formed and then bound to the existing composite or monolithic structure in the same or different manner, and this process can be repeated any number of times.

At 226, the example method 200 ends.

It will be appreciated that while FIG. 2 provides for applying a layer of powdered metal before printing a binder on the printing area, the instant application, including the claimed subject matter is not intended to be so limited. For example, in another embodiment, the binder may be applied first and the powdered metal may be dispensed, or applied, on top of the binder, causing the powdered metal (e.g., as it is applied) to be bound to the binder. Thus, the binder is printed on the printing area before the metal powder is applied. In yet another embodiment, the binder and metal powder are applied substantially concurrently (e.g., as the binder is being printed on the printing area, the metal powder is being applied). Therefore, the binder may be applied before, during, and/or after the application of the powdered metal for the corresponding layer. Moreover, it will be appreciated that a different order of operations may be performed for respective layers. For example, during the creation of a first layer, a metal powder may be applied first and then a binder may be printed on top of the metal powder, and during the creation of the second layer, a binder may be applied first and a metal powder may be applied second. Thus, there are numerous combinations for applying powder and printing a binder that can be carried out, and that are contemplated herein.

Figure 3:
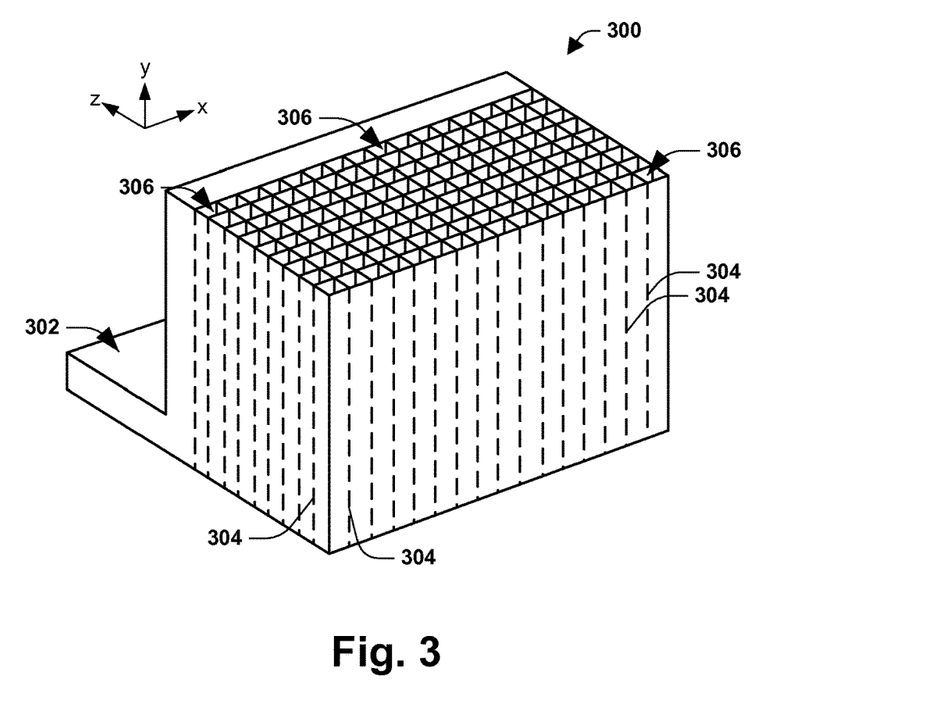
FIG. 3 illustrates a side view of an example two-dimensional anti-scatter module.

FIG. 3 illustrates an example three-dimensional metal structure that may be constructed using a three-dimensional metal printing processes (e.g., as described with respect to FIG. 2). More particularly, FIG. 3 illustrates an example two-dimension anti-scatter module 300 that may be part of an anti-scatter grid (e.g., 122 in FIG. 1). Such an anti-scatter module 300 may be positioned above an underlying detector array (e.g., 110 in FIG. 1) and (optionally) attached to the detector array and/or another portion of an object scanning apparatus (e.g., 102 in FIG. 1), such as a wall of a rotating gantry portion (e.g., 104 in FIG. 1) of the object scanning apparatus, through an attachment portion 302, for example.

The anti-scatter module 300 comprises a plurality of anti-scatter plates or septa 304 (e.g., blade-like objects that appear to be protruding from a detector surface of the detector array) and transmission channels 306, or openings, between the respective anti-scatter septa 304. Generally, the anti-scatter septa have a height (e.g., y dimension) of about 10 mm to about 35 mm and are configured to absorb, attenuate, or otherwise alter secondary radiation so that it is not detected by channels of the detector array and can be composed of molybdenum, tungsten, and/or any other material that has characteristics that make it able to absorb, or otherwise alter radiation striking the anti-scatter septa 304. The transmission channels 306 are configured to allow primary radiation to pass through the anti-scatter module 300 and be detected by the underlying detector array. In this way, primary radiation can pass through the anti-scatter module 300 while secondary radiation is absorbed, for example, so that it is not detected by the underlying detector array 302.

The anti-scatter module 300 is comprised of a plurality of layers of radiation attenuating powdered metal, such as tungsten and/or molybdenum, for example, and a binding agent configured to establish pattern(s) in/formed out of the radiation attenuating metal(s) and/or to infiltrate the plurality of layers, or at least two adjacent layers, of the radiation attenuating powdered metal. In this way, the infiltrated layers are bound together (e.g., such that a first layer is bound to a second, adjacent layer of radiation attenuating powder).

As described above, generally respective layers of the anti-scatter module 300 have a thickness (e.g., y-dimension) of about 20 microns to about 100 microns, and thus an anti-scatter module 300 having a height of 10 millimeters or more may be comprised one hundred or more layers of powdered metals. Because the layers are constructed using a printing technique (e.g., as described with respect to FIG. 2) and because a binding agent infiltrates the respective layers (e.g., as opposed to merely being applied to a top and/or bottom surface of respective layers), the layers generally cannot be discriminated from one another. Stated differently, unlike casting techniques, where two or more layers are glued together (e.g., leaving a small crevice between two layers), adjacent layers of an anti-scatter module 300 manufactured using a printing technique are in direct contact (e.g., generally throughout a common surface), and are adhered together using a resin, epoxy, etc. that infiltrates the adjacent layers (e.g., causing the layers to adhere together). Thus, a resin is not merely applied to a contact surface (e.g., a surface where two layers contact one another) as is common in casting techniques, but rather is applied substantially throughout the two adjacent layers to form a composite structure. Thus, as illustrated, in FIG. 3, layers of the anti-scatter module 300 cannot be discriminated. That is, the anti-scatter module is substantially uniform such that one layer cannot be differentiated from another, or that interfaces between respective layers are substantially indiscernible.

Moreover, it will be appreciated to those skilled in the art that the composition of the layers may make it difficult to differentiate a first layer from a second layer. That is, using the printing techniques described herein, the composition of a first layer (e.g., the amount of powdered metal, the amount of resin, the chemical make-up of the resin, etc.) may substantially match the composition of a second layer (e.g., although possible, the batch of resin or "ink" in the printer is not changed between layer printings). This is particularly evident if a final binder (e.g., applied to the entire structure once all of the layers have been constructed) displaces previously applied binders. That is, because the final binder is applied in a single batch, the probability of variations in the composition of various layers of the anti-scatter device is mitigated. It will be appreciated that such consistency is difficult to achieve with casting techniques because the casting are generally poured individually (and may not be poured using the same batch of resin). Moreover, possible variations in the heating/cooling process may cause a first layer of the anti-scatter device produced from a first mold to be slightly different in composition (or otherwise) than a second layer of the anti-scatter device produced from a second mold.

It will be understood to those skilled in the art that the anti-scatter module 300 depicted in FIG. 3 is a two-dimensional anti-scatter module. That is, the anti-scatter module 300 is comprised of both z-axis anti-scatter plates or septa and x-axis anti-scatter plates or septa. It will be appreciated that z-axis anti-scatter septa are used herein to refer to septa that have more surface area laying in x,y planes than in y,z planes, and x-axis anti-scatter septa are used herein to refer to anti-scatter septa that have more surface area laying in y,z planes than in x,y planes. That is, the z-axis anti-scatter septa are substantially in x,y planes (although they do have a little thickness that extends in the z direction), and the x-axis anti-scatter septa are substantially in y,z planes (although they do have a little thickness that extends in the x direction). While reference is made to x-axis and z-axis anti-scatter septa, it will be appreciated that x-axis anti-scatter septa can have an x-dimension component and z-axis anti-scatter septa can have a z-dimension component. For example, an anti-scatter septum may be in the shape of an "L" and be referred to as both an x-axis anti-scatter septum and a z-axis anti-scatter septum.

It will be appreciated that while FIG. 3, illustrates a two-dimensional anti-scatter grid, an anti-scatter device manufactured using the printing technique described herein does not have to be a two-dimensional anti-scatter grid. For example, in another embodiment, the printing techniques described herein may be used to manufacturer a one-dimensional anti-scatter module comprised of merely a plurality of x-axis (or z-axis) anti-scatter septa. It will be understood to those skilled in the art that because there are no z-axis anti-scatter septa, transmission channels comprised in a one-dimensional anti-scatter module are generally elongated relative to the transmissions channels 306 comprised within a two-dimensional anti-scatter module, such as the anti-scatter module 300 illustrated in FIG. 3. It will be appreciated that in yet another embodiment, the anti-scatter module can be comprised of z-axis anti-scatter septa but not x-axis anti-scatter septa.

Moreover, it will be appreciated that while reference is made to the manufacturing of an anti-scatter device, or more particularly to the manufacturing of an anti-scatter grid, to the extent possible the techniques described, including the claimed subject matter, are not intended to be so limited. That is, to the extent possible, the techniques described herein may be applied to the manufacturing of a plurality of different metal components that may be used in a plurality of different fields.

Figure 4:
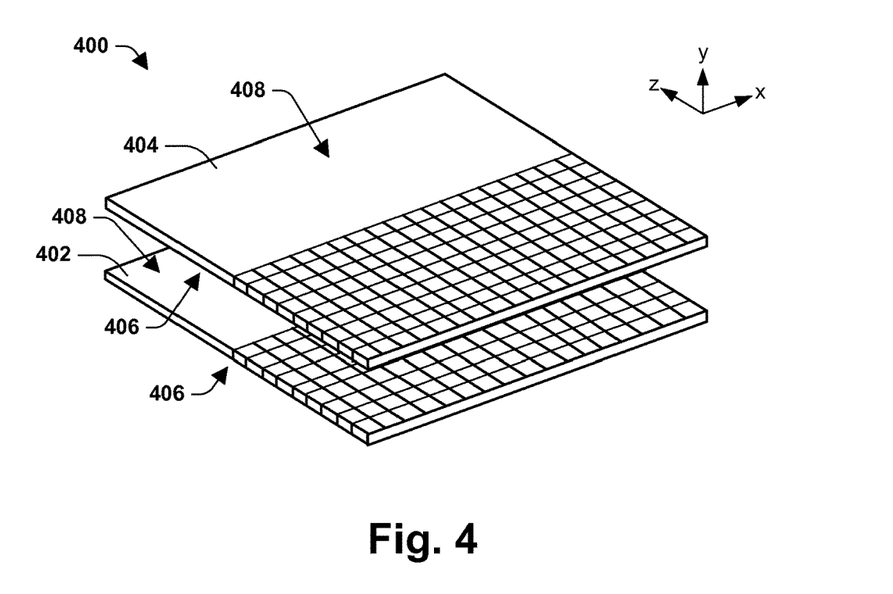
FIG. 4 illustrates example layers or slices of a three-dimensional model representative of a three-dimensional metal structure that may be manufactured using three-dimensional metal printing techniques described herein.

FIG. 4 illustrates the decomposition of a three-dimensional metal apparatus (e.g., of the two-dimensional anti-scatter module 300 illustrated in FIG. 3), or more particularly the decomposition of an example model 400 representing the three-dimensional metal apparatus (e.g., which may take place at 206 in FIG. 2). As illustrated, the three-dimensional metal apparatus is decomposed into at least two layers 402, 404, or two slices. It will be appreciated that the three-dimensional metal apparatus illustrated in FIG. 3 may actually be decomposed into more layers, but for purposes of illustration, merely two layers (e.g., a bottom two layers) of the three-dimensional metal apparatus are illustrated. That is, all of the layers of the two-dimensional anti-scatter module 300 illustrated in FIG. 3 are not illustrated in the example model 400.

To create the first layer, a metallic powder, such as tungsten powder, molybdenum powder, and/or any other powder that satisfies predefined conditions for the three-dimensional metal structure is applied to a printing area, and a binder is used to bind the powdered metal particles together. Generally, the binder is printed onto the printing area or onto the layer of metallic powder based upon a pattern that is defined by the model 400. Thus, during the printing of the first layer of the three-dimensional metal apparatus, a printer prints the binder according to a pattern yielded from the first slice 402 of the three-dimensional model 400.

Once the first layer is created, a second layer may be created adjacent (e.g., on top of or below the first layer) to create a metal structure having an increased thickness (e.g., y-dimension) relative to the thickness of the metal structure after merely a single layer is created). To create the second layer, additional metallic powder (e.g., having the same or different composition as the metallic powder used to create the first layer) is applied to the printing area and additional binding material (e.g., having the same or different composition as the binder used to create the first layer) is printed onto the printing area, or onto the second layer of metallic powder based upon a pattern that is defined by the model 400. Thus, during the printing of the second layer of the three-dimensional metal apparatus, a printer prints the binder according to a pattern yielded from the second slice 404 of the three-dimensional model.

Generally, respective layers (e.g., constructed based upon their respective three-dimension slice 402, 404) comprise a bottom surface 406 and a top surface 408, and when printed, adjacent surfaces of the respective layers are in direct physical contact. For example, as illustrated, top surface 408 of a first layer constructed based upon a first slice 402 can be in direct physical contact with a bottom surface 406 of a second layer constructed based upon a second slice 404. In one embodiment, the direct physical contact occurs across substantially all of the contacting surface (e.g., the bottom surface 406 of the second layer 404 is in direct physical contact with substantially all of the top surface 408 of the first layer 402). Moreover, in one embodiment, because a binder, or binding agent, infiltrates the first and second layers to bind the layers (e.g., establishing a composite structure as described above), no intervening materials and/or substances need be inserted between the first and second layer (e.g., such as a resin which is commonly inserted to adhere two castings together). That is, the binding agent is configured to infiltrate the layers such that an interface between a first layer 402 of the radiation attenuating powdered metal and a second layer 404 of the radiation attenuating powdered metal is substantially indiscernible. It will be appreciated that due to focusing requirements, in actuality a first layer may be discernable from a second layer because the first layer may have different dimensions than the second layer. However, such differentiation is due to the dimensions of the layers, rather than the composition of the layers and/or because the layers are adhered to one another, for example.

It will be appreciated that the acts of applying metallic powder and a binder to create layers of a three-dimensional model may be repeated n number of times, where n corresponds to a number of layers specified by the decomposition of the model 400. Moreover, it will be appreciated that while the first and second layers 402 and 404 of the example model 400 appear to have a substantially similar shape (e.g., and thus substantially matching patterns would be generated from the first and second layers 402 and 404), the pattern is a function of the shape of the corresponding layer. Thus, the pattern corresponding to the second layer 404 may be different than the pattern corresponding to the first layer where the first and second layers have different shapes, for example.

Figure 5:
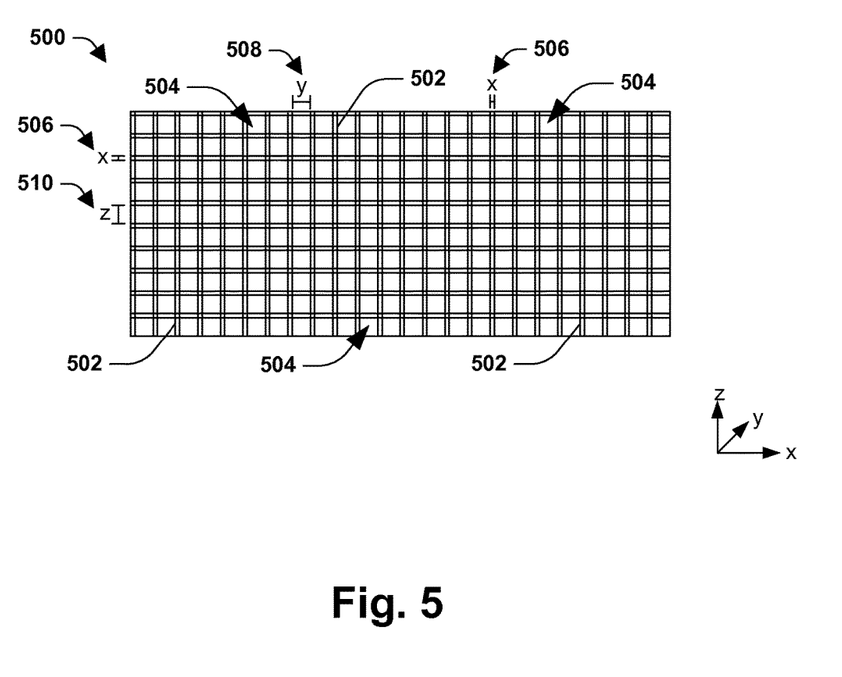
FIG. 5 illustrates a top-down view of an example anti-scatter grid.

FIG. 5 illustrates a top-down view (e.g., looking down from a radiation source 118 in FIG. 1) of a portion of an anti-scatter grid 500 (e.g., 300 in FIG. 3) that may be positioned above an underlying detector array (e.g., 110 in FIG. 1), for example. As illustrated, the anti-scatter grid 500 is a two-dimensional anti-scatter grid comprised of a plurality of anti-scatter modules similar to the anti-scatter module 300 depicted in FIG. 3. It will be appreciated that in another embodiment, the anti-scatter grid 500 can be a one-dimensional anti-scatter module.

As illustrated, the anti-scatter grid 500 is comprised of a plurality of anti-scatter plates or septa 502 and a plurality of transmission channels 504. In one embodiment, where the metal powder is comprised of tungsten, for example, the anti-scatter septa 502 may have a thickness 506 (x) of less than 0.2 mm in both the x direction and the z direction. The transmission channels 504 have a width 508 (y) of about 1.097 mm and a length 510 (z) of about 1.024 mm. It will be appreciated that these dimensions (e.g., the dimensions of the anti-scatter septa 502 and the dimensions of the transmission channels 504) may have a manufacturing tolerance of plus or minus 30 microns, for example. It will also be appreciated that the foregoing dimensions and/or tolerances are intended to merely illustrate example dimensions of an anti-scatter grid and are not intended to limit the scope of the instant application. Thus, the dimensions of an anti-scatter grid may differ from those herein described and may depend upon an aspect ratio and/or scatter rejection percentage that is suitable for the imaging system in which the anti-scatter grid is comprised.

Figure 6:
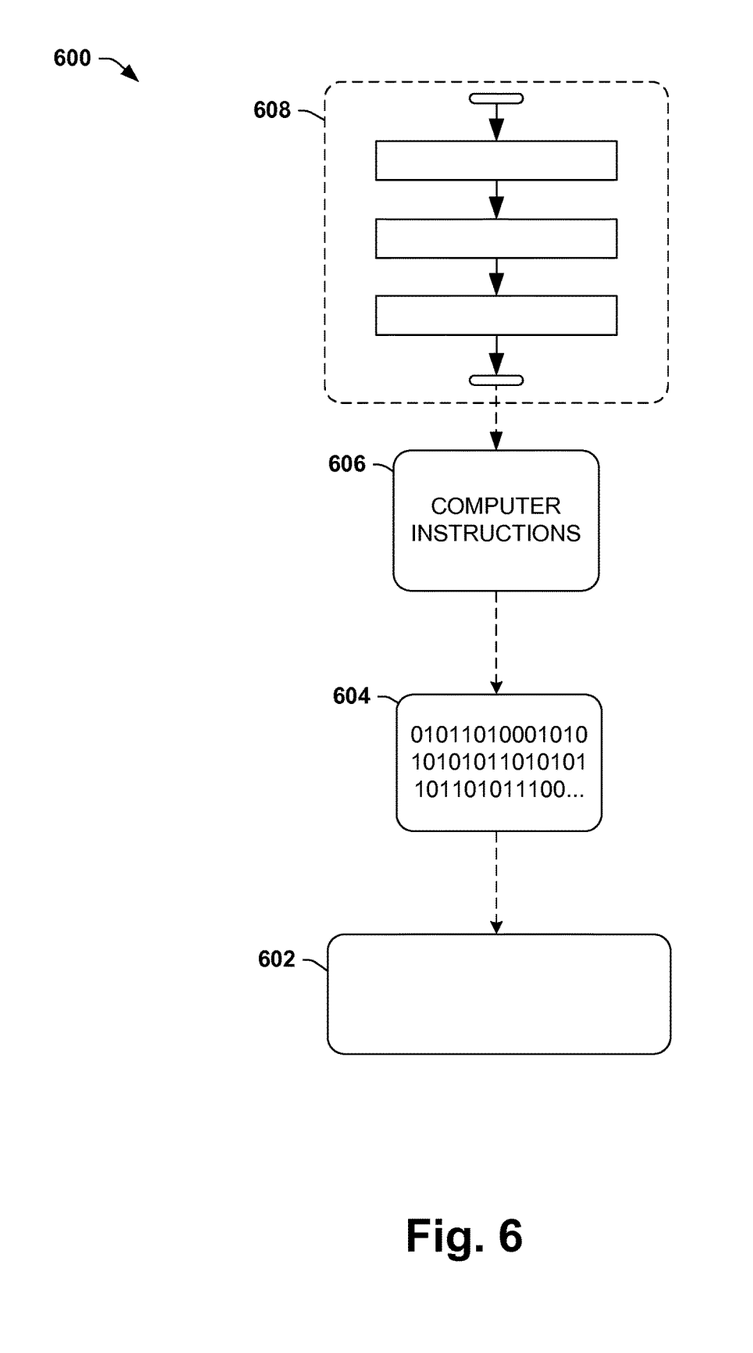
FIG. 6 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to one or more of the principles set forth herein. In one such embodiment 600, the processor-executable instructions 606 may be configured to perform a method 608, such as at least some of the example method 200 of FIG. 2, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for three-dimensional metal printing of an anti-scatter device configured to attenuate ionizing radiation, comprising:
   creating a first layer of the anti-scatter device, comprising:
      applying a first binder onto a printing area according to a first pattern; and
      applying a first layer of powdered metal onto the printing area, wherein particles of the first layer of powdered metal are bound by the first binder;
   creating a second layer of the anti-scatter device, comprising:
      applying a second binder onto the printing area according to a second pattern; and
      applying a second layer of powdered metal onto the printing area, wherein particles of the second layer of powdered metal are bound by the second binder; and
   infiltrating the first layer of the anti-scatter device and the second layer of the anti-scatter device using a third binder, wherein the third binder displaces at least some of the first binder or the second binder.

2. The method of claim 1, wherein the first layer of powdered metal comprises a first metal and the second layer of powdered metal comprises a second metal different than the first metal.

3. The method of claim 1, comprising thermally activating the third binder to bind the first layer to the second layer.

4. The method of claim 1, wherein the first binder is different than the second binder.

5. The method of claim 1, comprising applying an ultraviolet light to the third binder to activate the third binder after the third binder has infiltrated the first layer of the anti-scatter device and the second layer of the anti-scatter device.

6. A method for three-dimensional metal printing, comprising:
   printing a first pattern onto a printing area by applying a first binder to the printing area;
   applying a first layer of powdered metal onto the printing area before or during or after the first binder is applied, the first binder configured to bind particles of the first layer of powdered metal;
   printing a second pattern on the printing area by applying a second binder to the printing area;
   applying a second layer of powdered metal onto the printing area before or during or after the second binder is applied, the second layer of powdered metal imposed adjacent the first layer of powdered metal, the second binder configured to bind particles of the second layer of powdered metal;
   infiltrating the first layer of powdered metal and the second layer of powdered metal using a third binder to yield a three-dimensional metal structure; and
   applying an ultraviolet light to the third binder to activate the third binder after the third binder has infiltrated the first layer of powdered metal and the second layer of powdered metal.

7. The method of claim 6, comprising generating the first pattern and the second pattern by decomposing a three-dimensional model of the three-dimensional metal structure to identify at least two slices, where a first slice of the at least two slices corresponds to the first pattern and a second slice of the at least two slices corresponds to the second pattern.

8. The method of claim 7, wherein the first slice and the second slice each have a thickness of between about 20 microns to about 100 microns.

9. The method of claim 6, wherein the first layer of powdered metal comprises one of tungsten powder or molybdenum powder and the second layer of powdered metal comprises the other of tungsten powder or molybdenum powder.

10. The method of claim 6, comprising, before infiltrating the first layer of powdered metal and the second layer of powdered metal using the third binder, submersing the first layer of powdered metal, having the particles bound by the first binder, in a fluid.

11. The method of claim 6, comprising, before infiltrating the first layer of powdered metal and the second layer of powdered metal using the third binder:
   displacing powdered metal of the first layer of powdered metal that is not bound by the first binder; and
   displacing powdered metal of the second layer of powdered metal that is not bound by the second binder.

12. The method of claim 6, wherein infiltrating the first layer of powdered metal and the second layer of powdered metal using a third binder comprises:
   submersing the first layer of powdered metal, having the particles bound by the first binder, and the second layer of powdered metal, having the particles bound by the second binder, in the third binder.

13. The method of claim 6, wherein the first layer of powdered metal comprises a first metal and the second layer of powdered metal comprises a second metal different than the first metal.

14. The method of claim 6, wherein the three-dimensional metal structure is an anti-scatter device configured to attenuate radiation.

15. The method of claim 14, wherein the anti-scatter device is an anti-scatter grid positioned between an object under examination and a detector array configured to detect radiation.

16. A method for generating a three-dimensional anti-scatter apparatus of a radiographic examination apparatus, comprising:
   creating a first layer of the three-dimensional anti-scatter apparatus using a radiation attenuating, powdered metal and a first binder;
   creating a second layer of the three-dimensional anti-scatter apparatus using the radiation attenuating, powdered metal and a second binder; and
   applying a third binder configured to bind the first layer of the three-dimensional anti-scatter apparatus to the second layer of the three-dimensional anti-scatter apparatus to generate the three-dimensional anti-scatter apparatus, wherein the third binder displaces at least some of the first binder or the second binder.

17. The method of claim 16,
wherein creating the first layer of the three-dimensional anti-scatter apparatus comprises:
applying a first layer of the radiation attenuating, powdered metal to a printing area, and
printing the first binder according to a specified print pattern for the first layer to bind the powdered metal comprised in the first layer; and
wherein creating the second layer of the three-dimensional anti-scatter apparatus comprises:
applying a second layer of the radiation attenuating, powdered metal on the printing area, the second layer applied adjacent to the first layer, and
printing the second binder according to a specified print pattern for the second layer to bind the powdered metal comprised in the second layer.

18. The method of claim 16, comprising activating the third binder to bind the first layer of the three-dimensional anti-scatter apparatus to the second layer of the three-dimensional anti-scatter apparatus.

19. The method of claim 18, wherein activating the third binder comprises heating the third binder to a temperature below a melting point of the radiation attenuating, powdered metal.

20. The method of claim 16, wherein the three-dimensional anti-scatter apparatus is a two-dimensional anti-scatter grid positioned between an object under examination and a detector array configured to detect radiation.

* * * * *